United States Patent [19]

Palardy et al.

[11] Patent Number: 5,002,713
[45] Date of Patent: Mar. 26, 1991

[54] METHOD FOR COMPRESSION MOLDING ARTICLES FROM LIGNOCELLULOSIC MATERIALS

[75] Inventors: Robert D. Palardy, Hancock; Bruce A. Haataja, Lake Linden; Andrew D. Williams, Chassell, all of Mich.

[73] Assignee: Board of Control of Michigan Technological University, Houghton, Mich.

[21] Appl. No.: 455,987

[22] Filed: Dec. 22, 1989

[51] Int. Cl.⁵ .......................... D04H 1/58; C08J 5/04
[52] U.S. Cl. ........................................ 264/109; 524/9; 524/13; 524/14; 528/44; 528/48
[58] Field of Search ...................... 264/109; 524/9, 13, 524/14; 528/44, 48; 156/331.4

[56] References Cited

U.S. PATENT DOCUMENTS

| | | | |
|---|---|---|---|
| 3,440,189 | 4/1969 | Sharp | 264/109 |
| 3,870,665 | 3/1975 | Diehr et al. | 524/9 |
| 3,969,459 | 7/1976 | Fremont et al. | 264/109 |
| 4,241,133 | 12/1980 | Lund et al. | 428/326 |
| 4,344,798 | 8/1982 | Gaul et al. | 106/123 |
| 4,361,612 | 11/1982 | Shaner et al. | 428/106 |
| 4,374,791 | 2/1983 | Farrissey et al. | 264/39 |
| 4,490,517 | 12/1984 | Fuzesi et al. | 527/401 |
| 4,643,860 | 2/1987 | Knudson et al. | 264/109 |
| 4,701,383 | 10/1987 | Janiga | 428/527 |
| 4,751,131 | 6/1988 | Barnes | 428/215 |
| 4,833,182 | 5/1989 | Isreal et al. | 524/14 |

FOREIGN PATENT DOCUMENTS 0039137 11/1981 European Pat. Off. .

OTHER PUBLICATIONS

Palardy, et al., "Low Temperature and High Moisture Content Production Developments of Wood Composite Panels", Abstract of Presentation at Annual Meeting of Forest Products Research Society, Louisville, Ky., Jun., 1987.

Primary Examiner—Mary Lynn Theisen
Attorney, Agent, or Firm—Michael, Best & Friedrich

[57] ABSTRACT

Flakeboard or particle board panels and other composite articles made from wood flakes or other particulate lignocellulosic materials having a relatively high internal bond and improved resistance to moisture are made from flakes or particles which have a moisture content of at least 15%. A catalyst capable of accelerating the reaction between the flakes or particles, the binder and water is applied to the flakes or particles prior to the addition of a moisture-tolerant particle board binder, such as an organic polyisocyanate. A mat of the resulting furnish is compression shaped under pressure and at a temperature less than 250° F. for a time period sufficient to form a composite article of the desired shape and/or dimensions.

25 Claims, No Drawings

METHOD FOR COMPRESSION MOLDING ARTICLES FROM LIGNOCELLULOSIC MATERIALS

BACKGROUND OF THE INVENTION

This invention relates to methods for compression molding lignocellulosic materials into articles, such as panels, boards, sheets, non-planar and multi-planar items, and the like, and more particularly, to such methods employing a lignocellulosic material having a high moisture content and a relatively low press temperature.

It is well known to manufacture so-called particle board or flakeboard by blending a suitable binder with wood flakes or other comminuted lignocellulosic materials, forming the resulting furnish into a mat and compressing the mat between heated platens to set the binder and bond the flakes together in a densified form. Conventional methods typically employ a press temperature of 300° to 400° F. and require the flakes to have a moisture content of about 2 to 8% prior to blending.

This requirement for low moisture content increases operating costs and adversely affects the quality of the final product. For instance, flakeboard panels made by conventional processes often are virtually oven dry, i.e., have a moisture content on the order of 1%, after completion of the press operation. Such panels are commonly used in an environment where the humidity is substantially higher. Consequently, the panels tend to absorb moisture and swell in thickness, particularly at the edges. If saturated with water and then dried, the panels do not return to the original thickness and remain permanently swollen.

Use of flakes or particles having a higher moisture content and a conventional press temperature can cause a rapid release of steam generated from the moisture in the mat, resulting in interior delaminations or "blows".

Representative prior methods for compression molding composite articles from lignocellulosic materials are disclosed in the following United States Patents:

| Patents | U.S. Pat. No. | Issue Date |
|---|---|---|
| Barnes | 4,751,131 | June 14, 1988 |
| Janiga | 4,701,383 | Oct. 20, 1987 |
| Fuzesi, et al. | 4,490,517 | Dec. 25, 1984 |
| Shaner, et al. | 4,361,612 | Nov. 30, 1982 |
| Gaul, et al. | 4,344,798 | Aug. 17, 1982 |
| Lund, et al. | 4,241,133 | Dec. 23, 1980 |
| Diehr, et al. | 3,870,665 | Mar. 11, 1975 |

PCT Publication No. 0 039 137 discloses another representative prior art process in which an encapsulated accelerator is admixed with an isocyanate binder prior to blending with the wood flakes to reduce the press time.

It has been proposed that the use of wood flakes having a moisture content of 15% or higher and lower press temperatures might alleviate the above-described shortcomings of many conventional processes. Palardy, et al., "Low Temperature and High Moisture Content Production Developments of Wood Composite Panels", Abstract of Presentation at Annual Meeting of Forest Products Research Society, Louisville, Ky., June, 1987, discloses the use of wood flakes having a moisture content of about 25%, a polyisocyanate binder and a press temperature of 210° F. However, a press time of 9 minutes or more was required to produce ½ inch thick panels, even though a tertiary amine was combined with the binder prior to blending with the flakes in an attempt to accelerate curing. At this thickness, a press time more than about 300 seconds generally is not acceptable for commercial applications.

SUMMARY OF THE INVENTION

An object of the invention is to provide a method for compression molding composite articles from comminuted lignocellulosic materials having a moisture content greater that about 15%.

Another object of the invention is to provide such a method in which the press time required for ½ inch thick articles can be about 300 seconds or less.

A further object of the invention is to provide such a method in which the composite article has improved swell properties and durability.

Other objects, aspects and advantages of the invention will become apparent to those skilled in the art upon reviewing the following description and the appended claims.

The invention provides an improved method for making composite articles, such as flakeboard or particle board panels or molded articles, from a comminuted lignocellulosic material, such as wood flakes, by applying a binder to the material and pressing the resulting furnish into an article of the desired shape and/or dimensions. A solution of a catalyst capable of accelerating the reaction between the lignocellulosic material, the binder and water is first applied to the surface of the particles of lignocellulosic material which have a moisture content of at least 15%, a water-tolerant particle board binder is subsequently applied to the particles and the resulting furnish is compression shaped under pressure and at an elevated temperature for a period of time sufficient to form a composite article of the desired shape and/or dimensions.

The binder preferably is an organic polyisocyanate and the preferred amount of a binder applied to the particulate lignocellulosic material is about 1 to about 10 weight %, based on the oven dry weight of the material. The catalyst preferably is a tertiary amine, an organo-metallic catalyst or mixtures thereof and the preferred amount of the catalyst is about 0.1 to about 20 weight %, based on the weight of the binder applied to the particles.

The press time and temperature preferably are controlled to provide a moisture content in the final product of about 8 to about 12% or higher, depending on the expected end use. The press temperature usually is within the range of about 100° to 400° F., and preferably less than about 250° F., and the press time preferably is about 300 seconds or less.

DESCRIPTION OF THE PREFERRED EMBODIMENTS

While the invention can be used to form composite articles in a variety of different shapes, it is particularly adaptable for use in making particle board or flakeboard panels and will be described for that application.

As used herein, the terms "particles of lignocellulosic material" and "particulate lignocellulosic material" include wood flakes, wood chips, wood fibers, wood shavings and particulate forms of agriculture products such as straw, flax residue, nut shells, hulls from cereal grains (e.g. rice, oats, etc.) and mixtures thereof. Non-lignocellulosic materials in flake, fibrous or other particulate form, such as glass fiber, mica, asbestos, rubber, plastics and the like, can be mixed with the lignocellulosic material.

The method of manufacturing wood flakeboard or particle board panels in accordance with the invention includes the general steps of comminuting small logs, industrial wood residue, branches or rough pulpwood into flake-like particles, adjusting the moisture content of the flakes to a desired moisture content greater than about 15% (this step not required for flakes having the desired moisture content), classifying the flakes to a predetermined size, applying a catalyst in solution to the wood flakes, subsequently applying a water-tolerant, particle board binder, and optionally a liquid wax, wood preservatives and/or other additives, to the wood flakes, forming the resulting furnish into a loosely-felted mat and compressing the mat between heated platens or the like under pressure and at a temperature of about 100° to about 400° F. for a sufficient time to form wood flakeboard or particle board panels of the desired thickness and to bond the wood flakes together.

The wood flakes can be prepared from various species of hardwoods and softwoods. Representative examples of suitable woods include aspen, maple, oak, yellow poplar, elm, balsam fir, pine, cedar, spruce, locust, beech, birch, Douglas fir and mixtures thereof.

The wood flakes can be produced by various conventional techniques. For example, pulpwood grade logs or so-called roundwood can be converted into flakes in one operation with a conventional roundwood flaker. Alternatively, logs and logging residue can be cut into fingerlings in the order of about 0.5 to 3.5 inches long with a conventional apparatus, and the fingerlings flaked in a conventional ring-type flaker. The woods preferably are debarked prior to flaking.

The dimensions of the wood flakes are not particularly critical. The flakes commonly have an average length of about 2 inches to about 6 inches, an average width of about 0.25 inch to about 3 inches, and an average thickness of about 0.005 to about 0.050, preferably about 0.015 to about 0.030 inch. Use of flakes thinner than about 0.010 inch tends to increase the surface area to the point where excessive amounts of catalyst and binder are required to obtain adequate bonding and flakes thicker than about 0.050 inch are relatively stiff and tend to require excessive compression to obtain the desired contact between the flakes. In any given batch, some of the flakes can be shorter than 1 inch and some can be longer than 6 inches, so long as the overall average length is within a desired range. The same is true for the thickness and width.

While the flake size can be controlled to a large degree during the flaking operation, it is usually necessary to use some classification in order to remove undesired particles, both undersized and oversized, and thereby ensure the average lengths, thickness and width of the flakes are within the desired ranges.

The moisture content of the wood flakes (based on the oven dry weight) is at least about 15 weight %, preferably about 15 to about 40 weight %, and most preferably about 15 to about 25 weight %. Flakes having a moisture content higher than that commonly used in the conventional methods for manufacturing or flakeboard or particle board panel are more pliable and the mat can be compressed to a relatively high density with minimal damage to the microstructure. Also, starting with wetter flakes permits the resulting composite product to have a moisture content relatively close to the equilibrium moisture content at ambient conditions during normal use, i.e., about 8 to about 12%. Thus, by this combination of minimized structural damage and higher final moisture content, the thickness swelling, particularly at the edges, exhibited by flakeboard or particle board panels produced by many conventional methods can be minimized.

Residual wood from some industrial processes have a moisture content within the desired range and, therefore, do not have to be dried. Flakes obtained from green woods have to be dried to reduce the moisture content to a level within the preferred range. However, the amount of drying required in this case is still substantially less than that required for many conventional methods which require a moisture content less than about 10%. Wood flakes having excessively high moisture contents tend to stick together and complicate classification and handling prior to adding the catalyst. When some drying is required, the flakes preferably are dried prior to classification. The moisture content of flakes from some aged woods may have a moisture content of less than 15%, in which case water can be sprayed onto the flakes as they are being tumbled in a rotary blender to increase the moisture content to the desired level.

A catalyst which is capable of accelerating the reaction between wood or other lignocellulosic material, the binder and water during the press cycle is applied to the flakes prior to applying the binder. The particular catalyst used depends primarily on the type of binder used. For example, when the binder is an organic polyisocyanate, suitable catalysts include tertiary amines, such as 1-methylimidazole (RC-102 marketed by Wyrough and Loser, Inc.), N,N'-dimethylethanol amine (Desmorapid DMEA marketed by Wyrough and Loser, Inc.) and 1,8-diazo-bicyclo (5,4,0) undecene-7 (Amicure SA-102 marketed by Air Products & Chemicals, Inc.), and organo-metallic catalysts, such as stannous octoate, dimethyltin dichloride and dibutyl tin dilaurate or mixtures thereof.

The amount of catalyst applied to the flakes depends primarily upon the specific binder used and the surface area of the flakes. The amount must be sufficient to provide an adequate amount of available catalyst to accelerate the reaction with the binder and provide the desired degree of curing within the time period of the press cycle. Generally, the amount of catalyst added to the flakes is about 0.1 to about 20, preferably about 1 to about 10, weight % of the binder subsequently applied to the flakes.

The catalyst preferably is applied in solution to maximize coverage of the wood flakes. Suitable solvents for the catalysts include water and organic solvents, such as proplyene carbonate.

Various suitable techniques can be used for applying the catalyst solution to the flakes. For example, droplets of the catalyst solution can be sprayed onto the flakes as they are being tumbled in a conventional rotary blender.

A water-tolerant, i.e., substantially water insoluble, particle board binder, and optionally wax, wood preservatives and/or other additives, is applied to the wood flakes after the catalyst has been applied. Suitable binders include those used in the manufacture of particle board, flakeboard and similar pressed fibrous products. Particle board binders known to be water-intolerant or water-soluble, such as some phenolic and formaldehyde binders, are not suitable. Water-tolerant organic polyisocyanates presently are preferred because they consume water in their reactions and have the ability to provide a strong internal bond and higher resistance to moisture and their capability of being used in a high moisture environment during application to the flakes and the press cycle. Suitable polyisocyanates are those containing at least two active isocyanate groups per molecule, including polymeric diphenylmethane diisocyanates, m- and p-phenylene diisocyanates, chlorophenylene diisocyanates, toluene di- and tri-isocyanates, triphenylmethane tri-isocyanates, diphenylether-2,4,4,'tri-isocyanate, polyphenolpolyisocyanates.

The amount of binder added to the flakes depends primarily upon the specific binder used, the size, moisture content and type of wood flakes and the intended use of the product. Generally, the amount of binder applied to the flakes is about 1 to about 10, preferably about 1.5 to about 6 weight %, as solids based on the oven dry weight of the flakes.

To maximize coverage of the flakes, the binder preferably is applied by spraying droplets of the binder in liquid form onto the flakes as they are being tumbled in a rotary blender or the like. Such a blender can be the same one used for applying the catalyst or a separate one. The moisture resistance of the final product can be improved by spraying a liquid wax emulsion onto the flakes. When the product is to be used for long-term exterior applications, a preservative for protecting the wood against a decay, fungi or insects can be added to the wood flakes. Any preservative which is compatible with the binder and catalyst can be used. A typical example of such preservatives include pentachlorophenol, chromated copper arsenate, ammonical copper arsenate, borates, chlorothalonil, various copper salts, chlorophyrifos and the like. Other additives, such as coloring agents, fire retardants, and the like may also be added to the flakes. The binder, wax and other additives can be added separately or in any sequence or in a combined form.

The resulting furnish, i.e., the mixture of flakes, catalyst and binder, and optionally wax, wood preservatives and/or other additives, is formed into a loosely-felted, single or multi-layered mat, which is compressed into a particle board or flakeboard panel or another composite article of the desired shape and/or dimensions. Generally, the moisture content of the furnish after completion of blending, including the original moisture content of the flakes and the moisture added by the catalyst, the binder and wax and other additives should be about 15 to about 40, preferably about 15 to about 25 weight % of the oven dry weight of the flakes.

The mat can be formed in any suitable manner. For example, the furnish can be deposited on a plate-like carriage carried on an endless belt or conveyor from one or more hoppers spaced above the belt. When a multi-layer mat is formed, a plurality of hoppers are used with each having a dispensing or forming head extending across the width of the carriage for successively depositing a separate layer of the furnish as the carriage is moved between the forming heads. The mat thickness will vary depending upon such factors as the size and shape of the wood flakes, the particular technique used in forming the mat, the desired thickness and density of the final product and the pressure used during the press cycle. The mat thickness usually is about 5 to 20 times the final thickness of the article. For example, for flakeboard or particle board panels of ½ inch thickness and a final density of about 35 lbs/ft³, the mat usually will be about 3 to 6 inches thick. After mat formation, a paper overlay, like that used in furniture panels or for exterior siding, can be applied to the mat prior to pressing.

Press temperatures, pressures and times vary widely depending upon the shape, thickness and the desired density of the composite article, the size and type of wood flakes, the moisture content of the wood flakes and the specific binder used.

The press temperature can be about 100° to about 400° F. In order to minimize generation of internal steam and the reduction of the moisture content of the final product below a desired level, e.g., about 8 to about 12%, the press temperature preferably is less than about 250° F. and most preferably about 210° to about 240° F.

The pressure used should be sufficient to press the wood flakes into intimate contact with each other without crushing them to the point of causing a breakdown of fibers with an attendant degradation in structural and dimensional integrity. The pressure usually is about 300 to about 800 psi.

The press time is sufficient to at least substantially cure the binder and provide a composite article of the desired shape and/or dimensions and strength. For the manufacture of flakeboard or particle board panels, the press time depends primarily upon the panel thickness and the pressure applied by the press and preferably is correlated with the press temperature so that the moisture content of the final product is about 8 to 12%. For ½ inch thick articles the press time generally is about 200 to about 300 seconds, with shorter press times usually being most desirable.

With further elaboration, it is believed that one skilled in the art, using the preceding description, can utilize the present invention to its fullest extent. The following examples are presented to exemplify embodiments of the invention and should not be construed as limitations thereof.

EXAMPLE 1

Fresh billets of aspen (Populus spp.) and hard maple (*Acer saccharum*) were flaked on a disc flaker to produce flakes having an average thickness of about 0.028 inch for aspen and about 0.022 inch for maple and an average length of about 3 inches and an average width of about 1 inch for both woods. The flakes were dried to a moisture content of about 4 weight % (based on oven dry weight) and classified in a Black-Clawson shaker with a ¼ inch screen to remove fines. One batch of the flakes was conditioned to a moisture content of approximately 20 weight % by spraying water on to the flakes while being tumbled in a rotary blender, followed by sitting overnight in a sealed bag. Another batch was left at a moisture content of about 7 weight %.

A polymeric diphenylmethane diisocyanate (Modur E-441 marketed by Mobay Chemical Corporation) was applied to both the dry and wet flakes by an air spray system in a rotary blender at a dosage rate of about 3 weight %, based on the oven dry weight of the flakes. A solution of a tertiary amine catalyst, 1-methylimidazole (RC-102 marketed by Wyrough and Loser, Inc.), was applied to one portion of the wetter flakes (Sample B) prior to applying the binder, at a dosage rate of about 10 weight %, based on the weight of the binder. No catalyst was added to another portion of the wetter flakes (Sample A).

Mats formed from Sample A and Sample B were pressed into flakeboard panels in an 18 inch X 18 inch press at a temperature of about 230° F. and an initial maximum mat pressure of about 500 psi for about 300 seconds. Once the desired panel thickness was reached, the pressure was reduced to hold the mat at that thickness. The thickness and target final density of the sample panels were about ½ inch and 35 lbs/ft³, respectively. As a control representative of conventional methods, mats formed from the drier flakes having a moisture content of 7% and to which no catalyst was applied of flakes were pressed into flakeboard panels in the same general manner, except that the press temperature was about 400° F. and the press time was 240 seconds. This moisture content, press temperature and press time is representative of many conventional methods.

Wax was not applied to any of the samples and flake orientation was random for all samples. All the sample panels were conditioned at 65° F. and 50% relative humidity and then tested for internal bond and also for thickness swell and water absorption after 24 hour water immersion (ASTM D-1037). The results from these tests are summarized in Table I.

TABLE I

Bond Strength and Thickness Stability of Flakeboard Panels

| Sample | Wood Type | Final Density, lb/ft³ | Internal Bond, psi | Thickness Swell, % | Water Absorption, % |
|---|---|---|---|---|---|
| A | aspen | 32.9 | 73.3 | 6.2 | 29.1 |
| B | aspen | 35.6 | 93.5 | 5.7 | 20.5 |
| Control | aspen | 35.6 | 106.2 | 11.2 | 26.1 |
| A | maple | 36.8 | 39.4 | 6.32 | 22.0 |
| B | maple | 39.3 | 118.4 | 6.12 | 20.8 |
| Control | maple | 41.1 | 96.5 | 7.22 | 18.0 |

From these results, it can be seen that the internal bond for ½ inch thick panels produced by the invention (Sample B) is comparable to or superior to that of panels of the same thickness produced by a conventional process, even though the wood flakes had a moisture content greater that 15% (i.e., 20%) and a press temperature less than 250° F. and a reasonable press time of 300 seconds were used. Also, from a comparison of Sample A and Sample B, it can be seen that use of a catalyst in accordance with the invention (Sample B) provides a significant improvement in the internal bond and reduction in thickness swell.

EXAMPLE 2

Tests using the same binder and general operating conditions described in Example 1 were conducted on aspen flakes having a moisture content of 18 weight % (based on oven dry weight). For one portion of the flakes (Sample A), a catalyst dissolved in acetone was mixed with the binder and the resulting mixture sprayed onto the flakes. For another portion of the flakes (Sample B), the catalyst dissolved in water was sprayed onto the flakes prior to applying the binder. The catalyst was 1,8-diazo-bicyclo (5,4,0) decene-7 (Amicure SA-102 marketed by Air Products & Chemicals, Inc.) and the amount applied, based on the weight of the binder, was 1% for Sample A and 10% for Sample B. The catalyst dosage was higher for Sample B because of the larger surface area of the flakes to be covered. Dosages at this level would not be feasible for Sample A because the catalyst-binder mixture would immediately start reacting and clog the spray equipment.

For still another portion of the flakes (Control), the binder was applied without any catalyst.

Mats from these samples were pressed into flakeboard panels as described in Example 1 and the internal bond strength of each was measured. The results from these tests are summarized in Table II.

TABLE II

Internal Bond Strength of Flakeboard Panels

| Sample | Internal Bond, psi |
|---|---|
| A | 63.8 |
| B | 138.8 |
| Control | 65.2 |

From these tests it can be seen that flakeboard panels having a significantly higher internal bond can be produced when a catalyst in solution is applied to the flakes prior to applying a binder (Sample B). On the other hand, when the same catalyst is combined with the binder prior to application (Sample A), the internal bond is about the same as with no catalyst (Control).

From the forgoing description, one skilled in the art can easily ascertain the essential characteristics of the invention and, without departing from the spirit and scope thereof, can make various changes and modifications to adapt the invention to various usages and conditions.

We claim:

1. In a method for making a composite article from particles of a lignocellulosic material by applying a particle board binder to the particles and pressing the resulting furnish into an article of the desired shape and/or dimensions, wherein the improvement comprises
    (a) applying to particles of a lignocellulosic material having a moisture content of at least about 15 weight %, based on the oven dry weight of said particles, a catalyst capable of accelerating the reaction between said material, the binder to be applied subsequently in step (b) and water;
    (b) subsequently applying to said particles a water-tolerant particle board binder; and
    (c) compression shaping the resulting furnish under pressure and at a temperature less than about 400° F. for a period of time sufficient to form a composite article of the desired shape and/or dimensions.

2. A method according to claim 1 wherein the moisture content of said particles is about 15 to about 40 weight % based on the oven dry weight.

3. A method according to claim 2 wherein said temperature is about 100 to about 400° F. during step (c).

4. A method according to claim 3 wherein said lignocellulosic material is wood.

5. A method according to claim 3 wherein said temperature is less than about 250° F. during step (c).

6. A method according to claim 5 wherein said temperature is about 210° to about 240° F. during step (c).

7. A method according to claim 1 wherein the article has an average thickness of about ½ inch and the time period for step (c) is about 300 seconds or less.

8. A method according to claim 1 wherein said binder is an organic polyisocyanate and the amount applied to said particles is about 1 to about 10 weight %, based on the oven dry weight of said particles.

9. A method according to claim 8 wherein in the amount of said binder applied to said particles is about 1.5 to about 6 weight %, based on the oven dry weight of said particles.

10. A method according to claim 1 wherein said catalyst is a tertiary amine, an organo-metallic catalyst or mixtures thereof and the amount applied to said particles is about 0.1 to about 20 weight %, based on the weight of said binder applied in step (b).

11. A method according to claim 10 wherein the amount of said catalyst is about 1 to about 10 weight %, based on the weight of said binder applied in step (b).

12. A method according to claim 8 wherein said binder is a diphenylmethane diisocyanate.

13. A method according to claim 10 wherein said catalyst is stannous octoate, dimethyltin dichloride or mixtures thereof.

14. A method according to claim 13 wherein said catalyst is 1-methylimidazole, N,N'-dimethylethanolamine or mixtures thereof.

15. In a method for making flakeboard panels by applying a particle board binder to wood flakes and pressing the resulting furnish into panels of the desired thickness, wherein the improvement comprises (a) applying to wood flakes having a moisture content of at least 15 weight %, based on the oven dry weight of said flakes, a solution of a catalyst capable of accelerating the reaction between said wood flakes, the binder to be applied subsequently in step (b) and water;

(b) subsequently applying to said wood flakes about 1 to about 10 weight %, based on the oven dry weight of said flakes, of a water-tolerant, organic, polyisocyanate particle board binder; and (c) compression molding the resulting furnish under pressure and at a temperature of about 100° to about 400° F. for a period of time sufficient to form a panel of the desired thickness and density.

16. A method according to claim 15 wherein the moisture content of said flakes is about 15 to about 40 weight % based on the oven dry weight of said flakes.

17. A method according to claim 16 wherein said catalyst is a tertiary amine, an organo-metallic catalyst or mixtures thereof and the amount applied to said flakes is about 0.1 to about 20 weight %, based on the weight of said binder applied in step (b).

18. A method according to claim 16 wherein said temperature is less than about 250° F. during step (c).

19. A method according to claim 16 wherein the article has an average thickness of about ½ inch and the time period for step (c) is about 300 seconds or less.

20. A method according to claim 17 wherein said binder is an organic polyisocyanate.

21. A method according to claim 20 wherein the amount of said binder applied to said flakes is about 1.5 to about 6 weight % based on the oven dry weight of said flakes.

22. A method according to claim 21 wherein said binder is a diphenylmethane diisocyanate.

23. A method according to claim 21 wherein said catalyst is a tertiary amine, an organo-metallic catalyst or mixtures thereof.

24. A method according to claim 23 wherein the amount of said catalyst applied to said flakes is about 1 to about 10 weight %, based on the weight of said binder applied in step (b).

25. A method according to claim 23 wherein said catalyst is 1-methylimidazole, N,N'-dimethylethanolamine or mixtures thereof.

* * * * *